US012034223B2

(12) United States Patent
(10) Patent No.: US 12,034,223 B2
(45) Date of Patent: Jul. 9, 2024

Chang et al.

(54) MOBILE DEVICE WITH COMMUNICATION AND SENSING FUNCTIONS

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 158 days.

(21) Appl. No.: 17/818,077

(22) Filed: Aug. 8, 2022

(65) Prior Publication Data

US 2023/0369762 A1 Nov. 16, 2023

(30) Foreign Application Priority Data

May 16, 2022 (TW) ................................. 111118175

(51) Int. Cl.
*H01Q 5/30* (2015.01)
*H01Q 1/22* (2006.01)
(Continued)

(52) U.S. Cl.
CPC ............... *H01Q 5/307* (2015.01); *H01Q 1/22* (2013.01); *H01Q 9/42* (2013.01)

(58) Field of Classification Search
CPC ............ H01Q 5/307; H01Q 1/22; H01Q 9/42; H01Q 5/378; H01Q 1/245
See application file for complete search history.

(56) References Cited

U.S. PATENT DOCUMENTS 6,198,442 B1 * 3/2001 Rutkowski ............... H01Q 1/36 343/702
7,602,341 B2 * 10/2009 Wei-Shan ............ H01Q 1/2258 343/702
(Continued)

FOREIGN PATENT DOCUMENTS

TW 201203695 A 1/2012
TW 201240206 A 10/2012
TW 201818612 A 5/2018

OTHER PUBLICATIONS

Chinese language office action dated Jun. 9, 2023, issued in application No. TW 111118175.

*Primary Examiner* — Hasan Islam
*Assistant Examiner* — Bamidele A Immanuel
(74) *Attorney, Agent, or Firm* — McClure, Qualey & Rodack, LLP

(57) ABSTRACT

A mobile device with communication and sensing functions includes a first radiation element, a second radiation element, a third radiation element, a fourth radiation element, a capacitor, a first metal element, a second metal element, a third metal element, a nonconductive support element, and a proximity sensor. The first metal element is coupled through the capacitor to a ground voltage. The second metal element is coupled to the first metal element. The third metal element is coupled to the first metal element. The third metal element and the second metal element substantially extend in opposite directions. The proximity sensor is coupled to the capacitor and the first metal element. A hybrid antenna structure is formed by a first radiation element, a second radiation element, a third radiation element, a fourth radiation element, a first metal element, a second metal element, and a third metal element.

8 Claims, 8 Drawing Sheets

100

(51) Int. Cl.
*H01Q 5/307* (2015.01)
*H01Q 9/42* (2006.01)

(56) References Cited

U.S. PATENT DOCUMENTS

| | | | | |
|---|---|---|---|---|
| 7,639,189 | B2 * | 12/2009 | Kim | H01Q 21/29 343/702 |
| 8,577,289 | B2 * | 11/2013 | Schlub | G01B 7/023 343/702 |
| 8,610,628 | B2 * | 12/2013 | Chen | H01Q 1/24 343/702 |
| 8,649,833 | B1 * | 2/2014 | Lee | H04M 1/026 455/82 |
| 8,779,987 | B2 * | 7/2014 | Endo | H01Q 1/243 343/702 |
| 8,854,268 | B2 * | 10/2014 | Lin | H01Q 5/371 343/702 |
| 9,179,299 | B2 | 11/2015 | Schlub et al. | |
| 9,608,331 | B1 * | 3/2017 | Rowson | H01Q 9/16 |
| 9,893,793 | B2 * | 2/2018 | Huang | H01Q 5/50 |
| 9,992,312 | B1 * | 6/2018 | Deng | H04Q 1/24 |
| 10,411,333 | B1 * | 9/2019 | Chang | G06F 1/1698 |
| 10,454,156 | B1 * | 10/2019 | Yang | H01Q 1/48 |
| 11,128,050 | B1 * | 9/2021 | Chuang | H01Q 5/371 |
| 11,870,477 | B2 * | 1/2024 | Yen | H01Q 9/0421 |
| 2005/0270241 | A1 * | 12/2005 | Qi | H01Q 9/42 343/702 |
| 2009/0051597 | A1 * | 2/2009 | Wen | H01Q 1/38 343/700 MS |
| 2013/0207861 | A1 * | 8/2013 | Huang | H01Q 1/2266 343/700 MS |
| 2014/0340265 | A1 * | 11/2014 | Vazquez | H01Q 1/243 343/702 |
| 2015/0200447 | A1 * | 7/2015 | Tang | H01Q 1/243 343/720 |
| 2016/0065260 | A1 * | 3/2016 | Heikura | H04B 1/3838 455/575.5 |
| 2016/0087343 | A1 * | 3/2016 | Chang | H01Q 5/378 343/720 |
| 2016/0124574 | A1 * | 5/2016 | Rouaissia | H01Q 1/243 345/174 |
| 2016/0226143 | A1 * | 8/2016 | Chen | H01Q 1/48 |
| 2016/0276738 | A1 * | 9/2016 | Chen | H01Q 1/243 |
| 2017/0160416 | A1 * | 6/2017 | Juan | H01Q 9/42 |
| 2018/0138581 | A1 * | 5/2018 | Chang | H01Q 5/30 |
| 2018/0233822 | A1 * | 8/2018 | Tang | H01Q 1/48 |
| 2019/0044232 | A1 * | 2/2019 | Tseng | H01Q 1/245 |
| 2019/0198975 | A1 * | 6/2019 | Chen | H01Q 9/42 |
| 2020/0076049 | A1 * | 3/2020 | Chang | H01Q 5/378 |
| 2021/0044000 | A1 * | 2/2021 | Chang | H01Q 1/38 |
| 2021/0075085 | A1 * | 3/2021 | Chang | H01Q 21/28 |
| 2021/0167491 | A1 * | 6/2021 | Chang | H01Q 1/48 |
| 2021/0167521 | A1 * | 6/2021 | Tsai | H01Q 1/38 |
| 2021/0175611 | A1 * | 6/2021 | Chang | H01Q 1/088 |
| 2021/0351509 | A1 * | 11/2021 | Lin | H01Q 5/328 |
| 2022/0021408 | A1 * | 1/2022 | Yen | H01Q 9/0421 |
| 2022/0085483 | A1 * | 3/2022 | Chang | H01Q 5/307 |
| 2022/0109250 | A1 * | 4/2022 | Tsai | H01Q 1/38 |

* cited by examiner

MOBILE DEVICE WITH COMMUNICATION AND SENSING FUNCTIONS

CROSS REFERENCE TO RELATED APPLICATIONS

This application claims priority of Taiwan Patent Application No. 111118175 filed on May 16, 2022, the entirety of which is incorporated by reference herein.

BACKGROUND OF THE INVENTION

Field of the Invention

The disclosure generally relates to a mobile device, and more particularly, it relates to a mobile device and a hybrid antenna structure in the mobile device.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

An antenna is an indispensable component in a mobile device that supports wireless communication. However, an antenna can easily be affected by adjacent metal components, which often interfere with the antenna and degrade the overall communication quality. Alternatively, the SAR (Specific Absorption Rate) may be too high to comply with regulations and laws. Accordingly, there is a need to propose a novel solution for solving the problems of the prior art.

BRIEF SUMMARY OF THE INVENTION

In an exemplary embodiment, the disclosure is directed to a mobile device with communication and sensing functions. The mobile device includes a first radiation element, a second radiation element, a third radiation element, a fourth radiation element, a capacitor, a first metal element, a second metal element, a third metal element, a nonconductive support element, and a proximity sensor. The first radiation element has a feeding point. The second radiation element is coupled to the first radiation element. The third radiation element is coupled to the first radiation element. The third radiation element and the second radiation element substantially extend in opposite directions. The fourth radiation element is coupled to a ground voltage. The fourth radiation element is adjacent to the third radiation element. The first metal element is coupled through the capacitor to a ground voltage. The second metal element is coupled to the first metal element. The third metal element is coupled to the first metal element. The third metal element and the second metal element substantially extend in opposite directions. The first radiation element, the second radiation element, the third radiation element, the fourth radiation element, the first metal element, the second metal element, and the third metal element are disposed on the nonconductive support element. The proximity sensor is coupled to the capacitor and the first metal element. A hybrid antenna structure is formed by the first radiation element, the second radiation element, the third radiation element, the fourth radiation element, the first metal element, the second metal element, and the third metal element.

In some embodiments, the sensing pad of the proximity sensor is formed by the first metal element, the second metal element, and the third metal element.

In some embodiments, the combination of the first radiation element, the second radiation element, and the third radiation element substantially has a first T-shape.

In some embodiments, the fourth radiation element substantially has a straight-line shape.

In some embodiments, the combination of the first metal element, the second metal element, and the third metal element substantially has a second T-shape.

In some embodiments, the vertical projection of the first T-shape at least partially overlaps the second T-shape.

In some embodiments, the nonconductive support element substantially has a plate shape or a 3D (Three-dimensional) L-shape.

In some embodiments, the hybrid antenna structure covers a first frequency band, a second frequency band, and a third frequency band. The first frequency band is from 700 MHz to 960 MHz. The second frequency band is from 1710 MHz to 2170 MHz. The third frequency band is from 2300 MHz to 2700 MHz.

In some embodiments, the total length of the first metal element and the third metal element is substantially equal to 0.25 wavelength of the first frequency band. The total length of the first radiation element and the second radiation element is substantially equal to 0.25 wavelength of the second frequency band. The total length of the second radiation element and the third radiation element is substantially equal to 0.5 wavelength of the third frequency band.

In another exemplary embodiment, the disclosure is directed to a mobile device with communication and sensing functions. The mobile device includes a nonconductive support element, a first radiation element, a second radiation element, a third radiation element, a fourth radiation element, a first metal element, a second metal element, and a third metal element. The nonconductive support element substantially has a 3D L-shape. The nonconductive support element has a first surface, a second surface, a third surface, a fourth surface, and a fifth surface. The first radiation element has a feeding point. The second radiation element is coupled to the first radiation element. The third radiation element is coupled to the first radiation element. The fourth radiation element is coupled to a ground voltage. The first radiation element, the second radiation element, the third radiation element, and the fourth radiation element are distributed over the first surface, the second surface, the third surface, and the fourth surface of the nonconductive support element. The second metal element is coupled to the first metal element. The third metal element is coupled to the first metal element. The first metal element, the second metal element, and the third metal element are distributed over the fourth surface and the fifth surface of the nonconductive support element. A hybrid antenna structure is formed by the first radiation element, the second radiation element, the third radiation element, the fourth radiation element, the first metal element, the second metal element, and the third metal element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
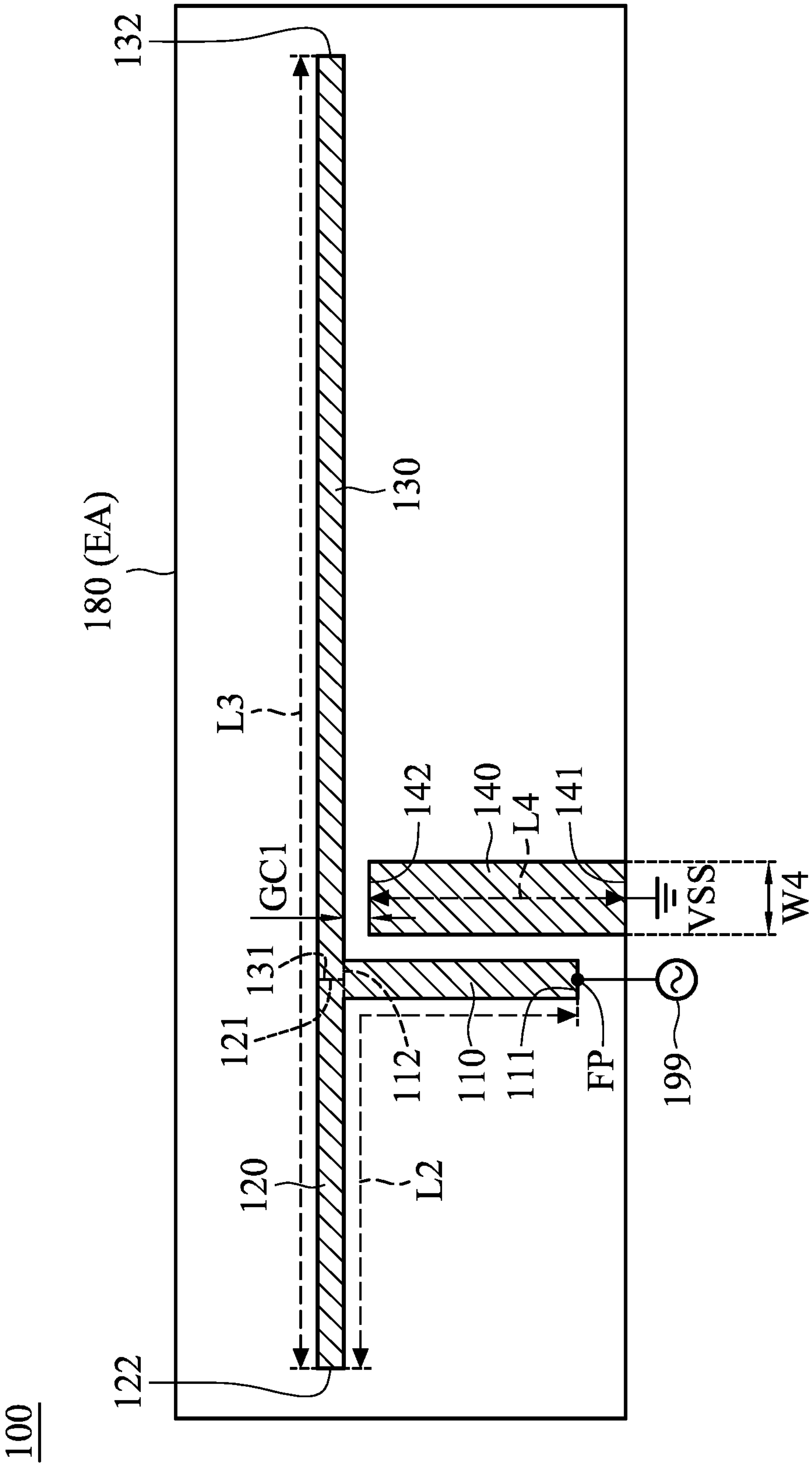
FIG. 1A is a top view of a mobile device according to an embodiment of the invention.

In order to illustrate the purposes, features and advantages of the invention, the embodiments and figures of the invention are shown in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
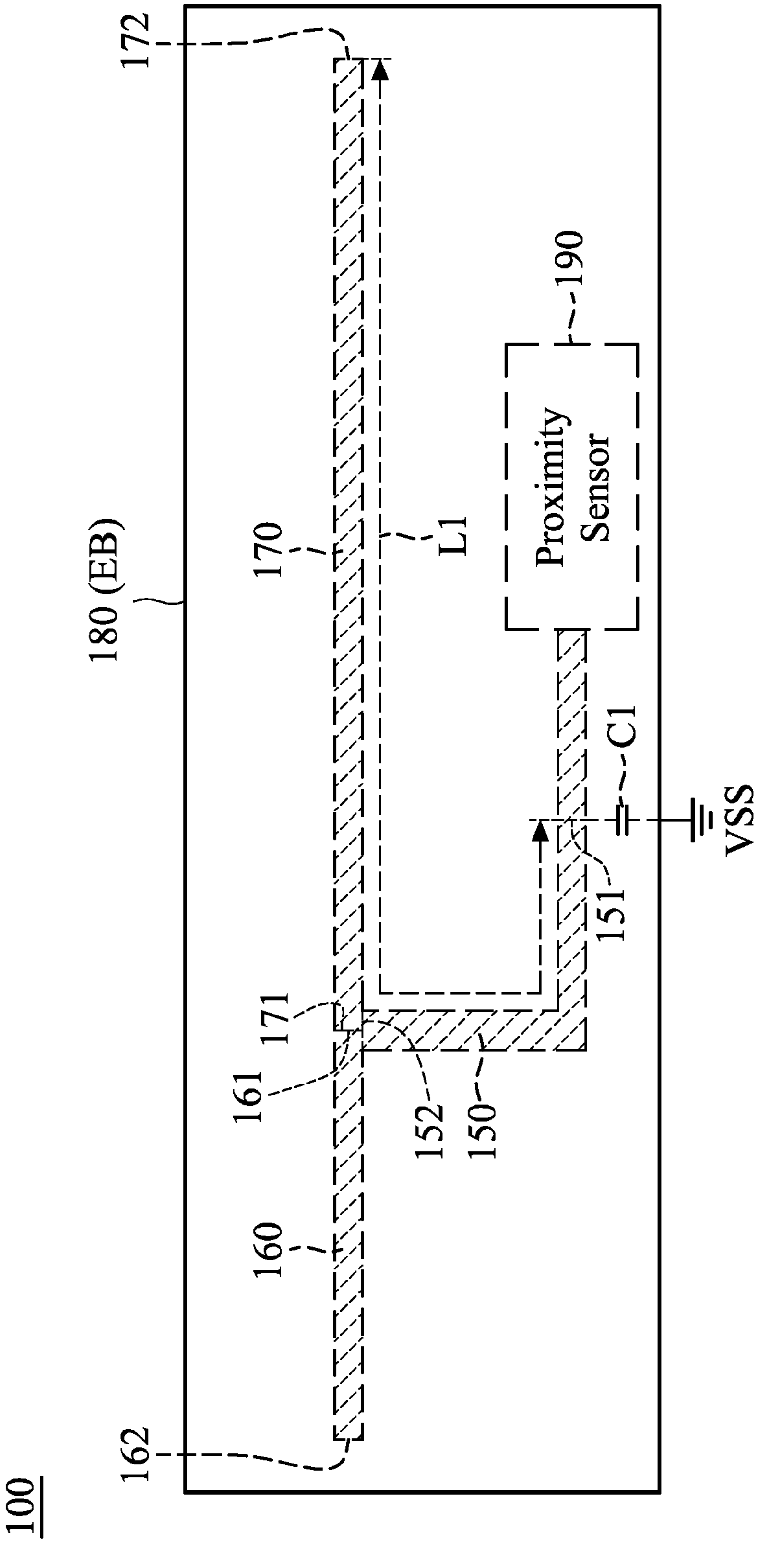
FIG. 1B is a see-through view of a mobile device according to an embodiment of the invention.
Figure 1C:
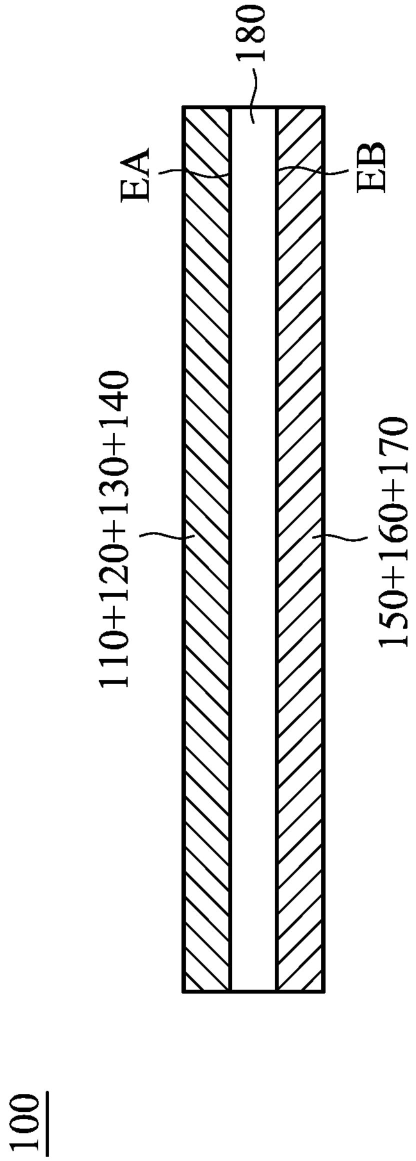
FIG. 1C is a side view of a mobile device according to an embodiment of the invention.

FIG. 1A is a top view of a mobile device 100 according to an embodiment of the invention. FIG. 1B is a see-through view of the mobile device 100 according to an embodiment of the invention. FIG. 1C is a side view of the mobile device 100 according to an embodiment of the invention. Please refer to FIG. 1A, FIG. 1B and FIG. 1C together. For example, the mobile device 100 may be a smart phone, a tablet computer, or a notebook computer, but it is not limited thereto.

In the embodiment of FIG. 1A, FIG. 1B and FIG. 1C, the mobile device 100 includes a first radiation element 110, a second radiation element 120, a third radiation element 130, a fourth radiation element 140, a capacitor C1, a first metal element 150, a second metal element 160, a third metal element 170, a nonconductive support element 180, and a proximity sensor 190. The first radiation element 110, the second radiation element 120, the third radiation element 130, and the fourth radiation element 140 may all be made of metal materials, such as copper, silver, aluminum, iron, or their alloys. It should be understood that the mobile device 100 may further include other components, such as a processor, a touch control panel, a speaker, a battery module, and a housing, although they are not displayed in FIG. 1A, FIG. 1B and FIG. 1C.

The nonconductive support element 180 may substantially have a plate shape. In some embodiments, the nonconductive support element 180 is implemented with a PCB (Printed Circuit Board) or an FPC (Flexible Printed Circuit). Specifically, the nonconductive support element 180 has a top surface EA and a bottom surface EB which are opposite to each other. The first radiation element 110, the second radiation element 120, the third radiation element 130, and the fourth radiation element 140 may all be disposed on the top surface EA of the nonconductive support element 180. The first metal element 150, the second metal element 160, the third metal element 170, and the capacitor C1 may all be disposed on the bottom surface EB of the nonconductive support element 180.

The first radiation element 110 may substantially have a short straight-line shape. Specifically, the first radiation element 110 has a first end 111 and a second end 112. A feeding point FP is positioned at the first end 111 of the first radiation element 110. The feeding point FP may be further coupled to a signal source 199. For example, the signal source 199 may be an RF (Radio Frequency) module.

The second radiation element 120 may substantially have a middle straight-line shape, and it may be substantially perpendicular to the first radiation element 110. Specifically, the second radiation element 120 has a first end 121 and a second end 122. The first end 121 of the second radiation element 120 is coupled to the second end 112 of the first radiation element 110. The second end 122 of the second radiation element 120 is an open end.

The third radiation element 130 may substantially have a long straight-line shape, and it may be substantially perpendicular to the first radiation element 110. Specifically, the third radiation element 130 has a first end 131 and a second end 132. The first end 131 of the third radiation element 130 is coupled to the second end 112 of the first radiation element 110. The second end 132 of the third radiation element 130 is an open end. For example, the second end 132 of the third radiation element 130 and the second end 122 of the second radiation element 120 may substantially extend in opposite directions. In some embodiments, the combination of the first radiation element 110, the second radiation element 120, and the third radiation element 130 substantially has a first T-shape.

The fourth radiation element 140 may substantially have a wide straight-line shape, and it may be substantially parallel to the first radiation element 110. Specifically, the fourth radiation element 140 has a first end 141 and a second end 142. The first end 141 of the fourth radiation element 140 is coupled to a ground voltage VSS. The second end 142 of the fourth radiation element 140 is an open end. For example, the ground voltage VSS may be provided by a system ground plane (not shown) of the mobile device 100, but it is not limited thereto. The fourth radiation element 140 is adjacent to the third radiation element 130. A coupling gap GC1 may be formed between the second end 142 of the fourth radiation element 140 and the third radiation element 130. It should be noted that the term “adjacent” or “close” over the disclosure means that the distance (spacing) between two corresponding elements is smaller than a predetermined distance (e.g., 10 mm or shorter), but often does not mean that the two corresponding elements directly touch each other (i.e., the aforementioned distance/spacing therebetween is reduced to 0).

The first metal element 150 may substantially have an L-shape. Specifically, the first metal element 150 has a first end 151 and a second end 152. The first end 151 of the first metal element 150 is coupled through the capacitor C1 to the ground voltage VSS. In some embodiments, the first radiation element 110 has a first vertical projection on the bottom surface EB of the nonconductive support element 180, and the first vertical projection at least partially overlaps the first metal element 150. It should be understood that the invention is not limited thereto. In alternative embodiments, the first metal element 150 substantially has a straight-line shape, such that the first vertical projection of the first radiation element 110 completely overlaps the first metal element 150.

The second metal element 160 may substantially have a middle straight-line shape, it may be substantially perpendicular to the first metal element 150. Specifically, the second metal element 160 has a first end 161 and a second end 162. The first end 161 of the second metal element 160 is coupled to the second end 152 of the first metal element 150. The second end 162 of the second metal element 160 is an open end. In some embodiments, the second radiation element 120 has a second vertical projection on the bottom surface EB of the nonconductive support element 180, and the second vertical projection at least partially overlaps the second metal element 160.

The third metal element 170 may substantially have a long straight-line shape, it may be substantially perpendicular to the first metal element 150. Specifically, the third metal element 170 has a first end 171 and a second end 172. The first end 171 of the third metal element 170 is coupled to the second end 152 of the first metal element 150. The second end 172 of the third metal element 170 is an open end. For example, the second end 172 of the third metal element 170 and the second end 162 of the second metal element 160 may substantially extend in opposite directions. In some embodiments, the third radiation element 130 has a third vertical projection on the bottom surface EB of the nonconductive support element 180, and the third vertical projection at least partially overlaps the third metal element 170. In some embodiments, the combination of the first metal element 150, the second metal element 160, and the third metal element 170 substantially has a second T-shape. The vertical projection of the aforementioned first T-shape at least partially overlaps the second T-shape. In alternative embodiments, the vertical projection of the aforementioned first T-shape completely overlaps the second T-shape.

The proximity sensor 190 is coupled to the capacitor C1 and the first end 151 of the first metal element 150. In some embodiments, a hybrid antenna structure is formed by the first radiation element 110, the second radiation element 120, the third radiation element 130, the fourth radiation element 140, the first metal element 150, the second metal element 160, and the third metal element 170, and it has the communication and sensing functions. In addition, a sensing pad of the proximity sensor 190 is formed by the first metal element 150, the second metal element 160, and the third metal element 170. The capacitor C1 is configured as a capacitive grounding path of the sensing pad. For example, the proximity sensor 190 may use the aforementioned sensing pad to detect a conductor under test, so as to generate a detection signal. Next, the mobile device 100 can estimate a distance between the sensing pad and the conductor under test by analyzing the detection signal, thereby reducing a corresponding SAR (Specific Absorption Rate). In alternative embodiments, the proximity sensor 190 and the capacitor C1 are disposed on another circuit board, and they are coupled through pogo pins or metal springs to the first metal element 150.

Figure 2:
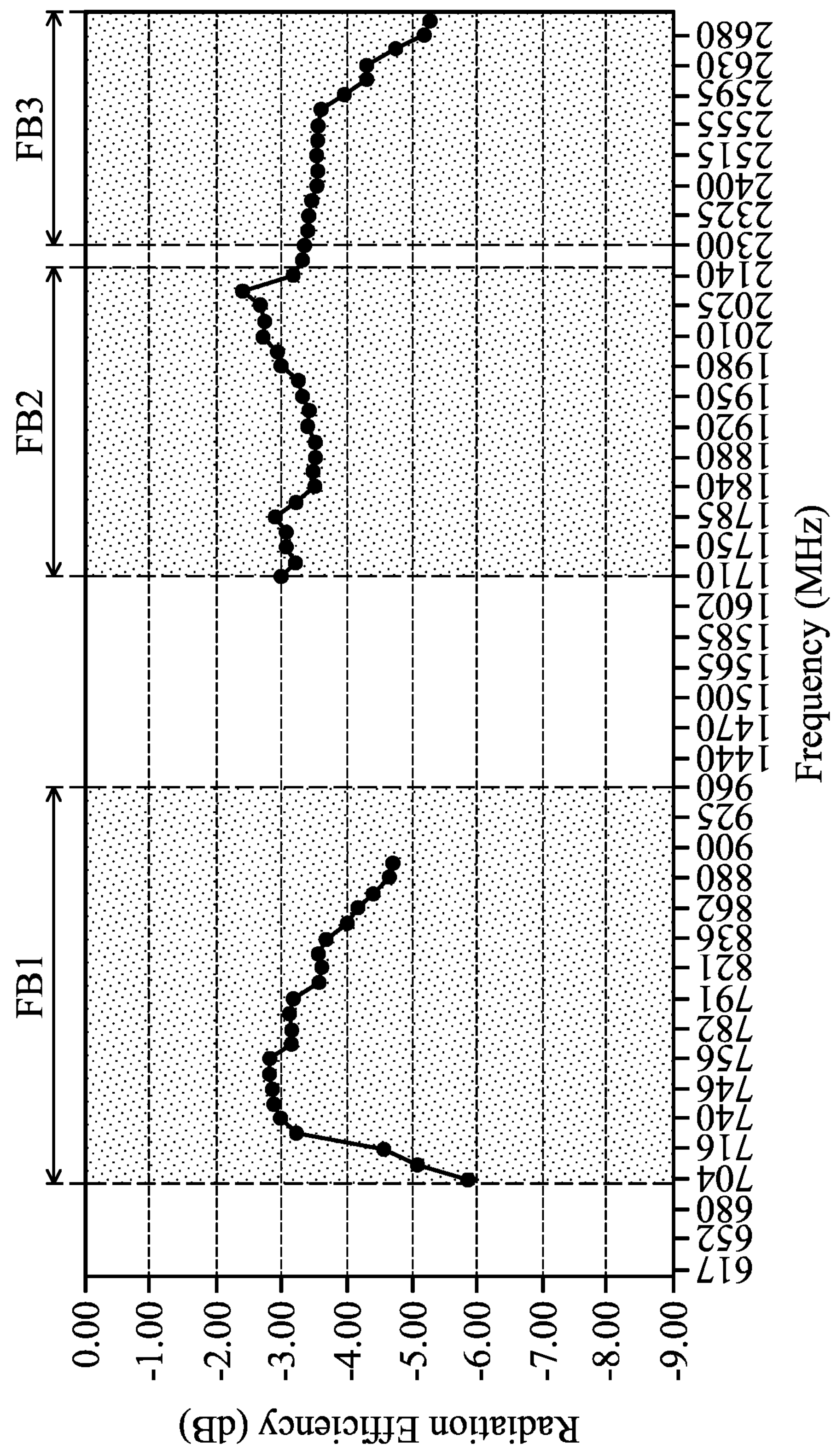
FIG. 2 is a diagram of radiation efficiency of a hybrid antenna structure of a mobile device according to an embodiment of the invention.

FIG. 2 is a diagram of radiation efficiency of the hybrid antenna structure of the mobile device 100 according to an embodiment of the invention. The horizontal axis represents the operational frequency (MHz), and the vertical axis represents the radiation efficiency (dB). According to the measurement of FIG. 2, the hybrid antenna structure of the mobile device 100 can cover a first frequency band FB1, a second frequency band FB2, and a third frequency band FB3. For example, the first frequency band FB1 may be from 700 MHz to 960 MHz, the second frequency band FB2 may be from 1710 MHz to 2170 MHz, and the third frequency band FB3 may be from 2300 MHz to 2700 MHz. Accordingly, the hybrid antenna structure of the mobile device 100 can support at least the wideband operations of LTE (Long Term Evolution).

With respect to the antenna theory, the first radiation element 110 and the third radiation element 130 are excited to generate the first frequency band FB1. In addition, the first metal element 150 and the third metal element 170 are excited by the first radiation element 110 and the third radiation element 130 using a coupling mechanism, so as to increase the bandwidth of the first frequency band FB1. The first radiation element 110 and the second radiation element 120 are excited to generate the second frequency band FB2. The second radiation element 120 and the third radiation element 130 are excited to generate the third frequency band FB3. Accordingly, the sensing pad formed by the first metal element 150, the second metal element 160, and the third metal element 170 is further used as an extension radiation element of the hybrid antenna structure of the mobile device 100.

In some embodiments, the element sizes and element parameters of the mobile device 100 will be described below. The total length of the first metal element 150 and the third metal element 170 may be substantially equal to 0.25 wavelength (λ/4) of the first frequency band FB1 of the hybrid antenna structure of the mobile device 100. The total length L2 of the first radiation element 110 and the second radiation element 120 may be substantially equal to 0.25 wavelength (214) of the second frequency band FB2 of the hybrid antenna structure of the mobile device 100. The total length L3 of the second radiation element 120 and the third radiation element 130 may be substantially equal to 0.5 wavelength (212) of the third frequency band FB3 of the hybrid antenna structure of the mobile device 100. The length L4 of the fourth radiation element 140 may be from 4 mm to 6 mm. The width W4 of the fourth radiation element 140 may be from 3 mm to 4 mm. The width of the coupling gap GC1 may be from 0.5 mm to 2 mm. The capacitance of the capacitor C1 may be from 30 pF to 50 pF. The above ranges of element sizes and element parameters are calculated and obtained according to the results of many experiments, and they help to optimize the SAR, the operational bandwidth, and the impedance matching of the hybrid antenna structure of the mobile device 100.

Figure 3:
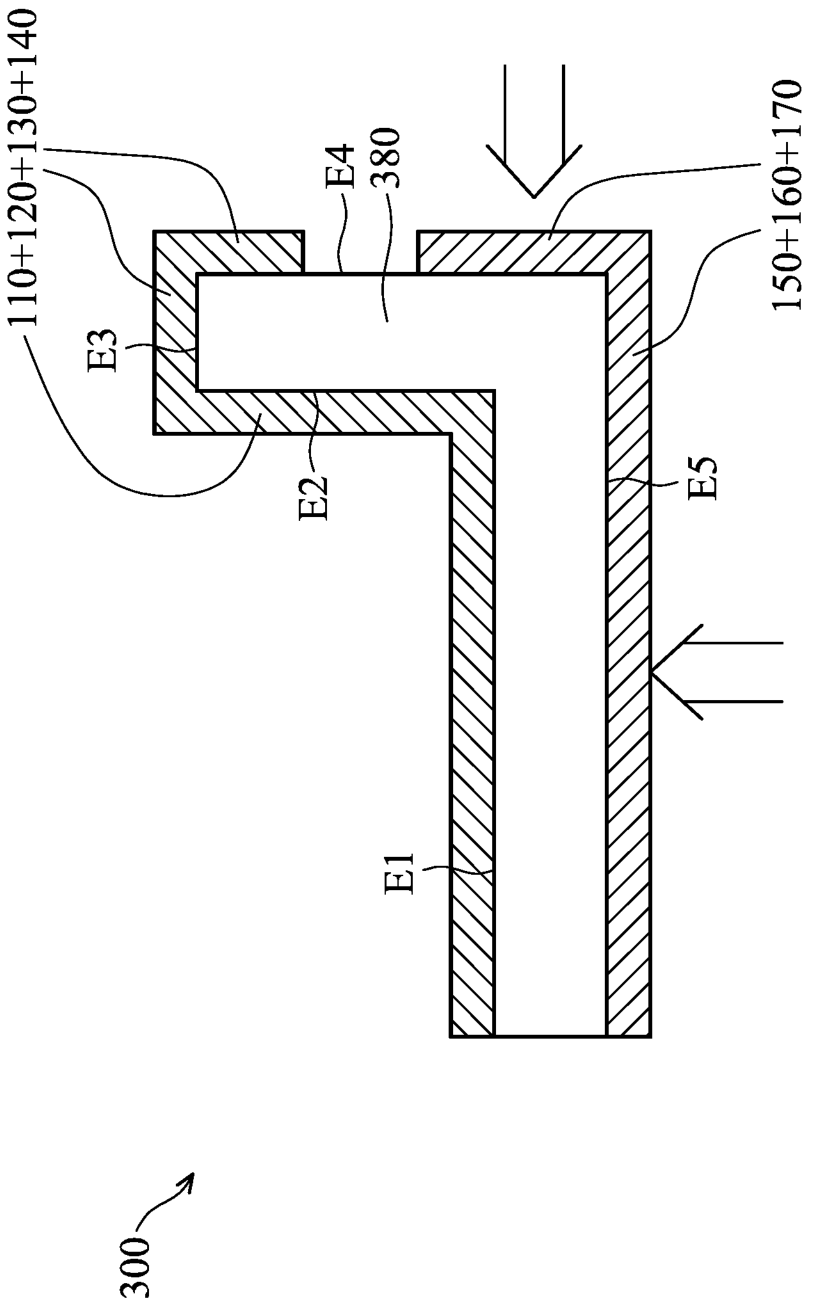
FIG. 3 is a partial sectional view of a mobile device according to an embodiment of the invention.
Figure 4A:
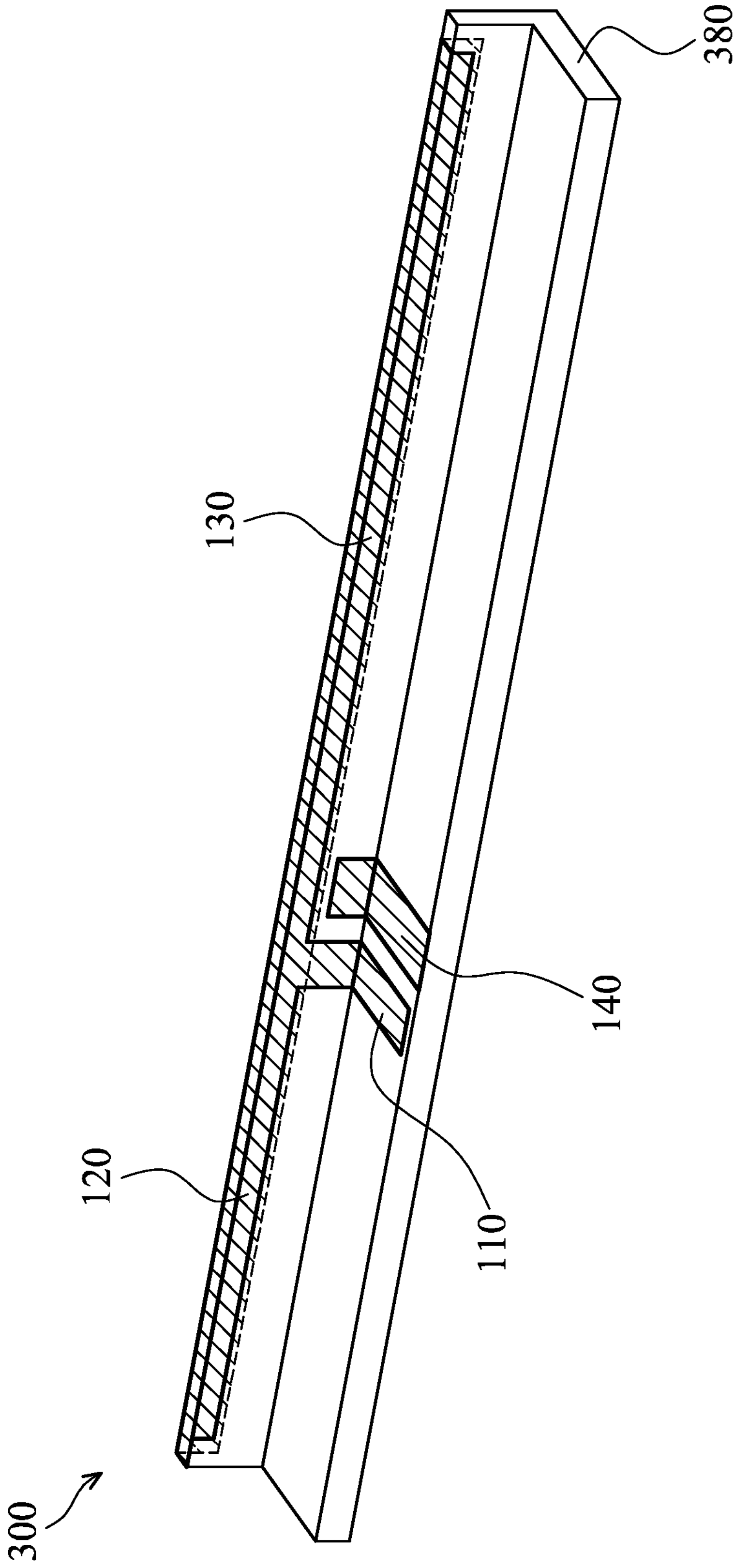
FIG. 4A is a partial perspective view of a mobile device according to an embodiment of the invention.
Figure 4B:
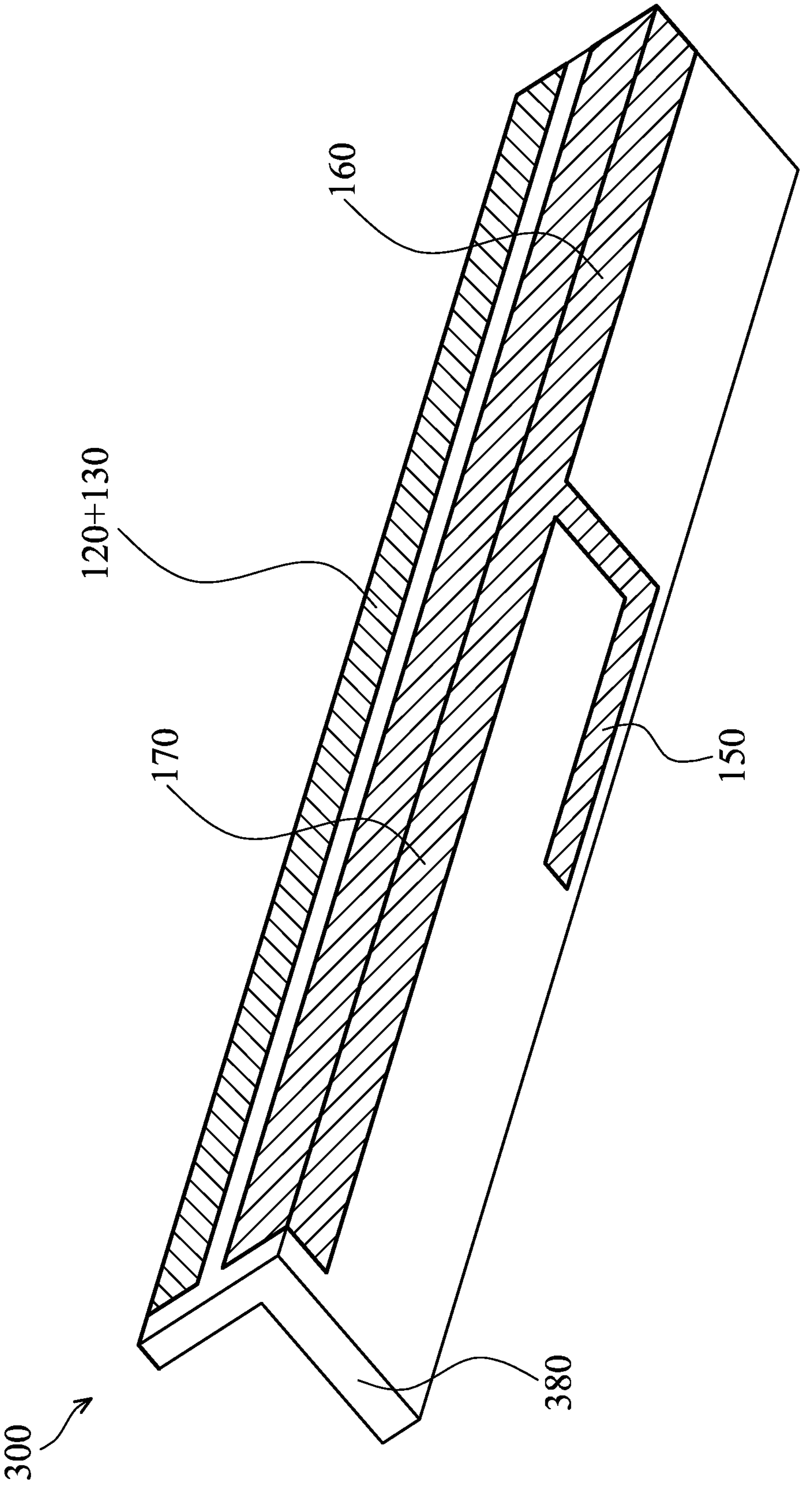
FIG. 4B is another partial perspective view of a mobile device according to an embodiment of the invention.

FIG. 3 is a partial sectional view of a mobile device 300 according to an embodiment of the invention. FIG. 4A is a partial perspective view of the mobile device 300 according to an embodiment of the invention. FIG. 4B is another partial perspective view of the mobile device 300 according to an embodiment of the invention. FIG. 3, FIG. 4A and FIG. 4B are similar to FIG. 1A, FIG. 1B and FIG. 1C. In the embodiment of FIG. 3, FIG. 4A and FIG. 4B, a nonconductive support element 380 of the mobile device 300 substantially has a 3D (Three-dimensional) L-shape. The nonconductive support element 380 has a first surface E1, a second surface E2, a third surface E3, a fourth surface E4, and a fifth surface E5. The first radiation element 110, the second radiation element 120, the third radiation element 130, and the fourth radiation element 140 are distributed over the first surface E1, the second surface E2, the third surface E3, and the fourth surface E4 of the nonconductive support element 380. In addition, the first metal element 150, the second metal element 160, and the third metal element 170 are distributed over the fourth surface E4 and the fifth surface E5 of the nonconductive support element 380. For example, any adjacent two surfaces of the first surface E1, the second surface E2, the third surface E3, the fourth surface E4, and the fifth surface E5 may be substantially perpendicular to each other. With such a 3D design, the hybrid antenna structure of the mobile device 300 has the longest distance to a nearby metal element (e.g., a display device). Thus, the radiating and sensing performance of the hybrid antenna structure is not negatively affected so much. Furthermore, the two arrows displayed in FIG. 3 represent the detection directions of the corresponding SAR probes when the mobile device 300 is under the SAR test. According to practical measurements, even if the first radiation element 110, the second radiation element 120, the third radiation element 130, the fourth radiation element 140, the first metal element 150, the second metal element 160, and the third metal element 170 are modified to have 3D shapes, they can still provide the communication and sensing functions. Other features of the mobile device 300 of FIG. 3, FIG. 4A and FIG. 4B are similar to those of the mobile device 100 of FIG. 1A, FIG. 1B and FIG. 1C. Accordingly, the two embodiments can achieve similar levels of performance.

Figure 5:
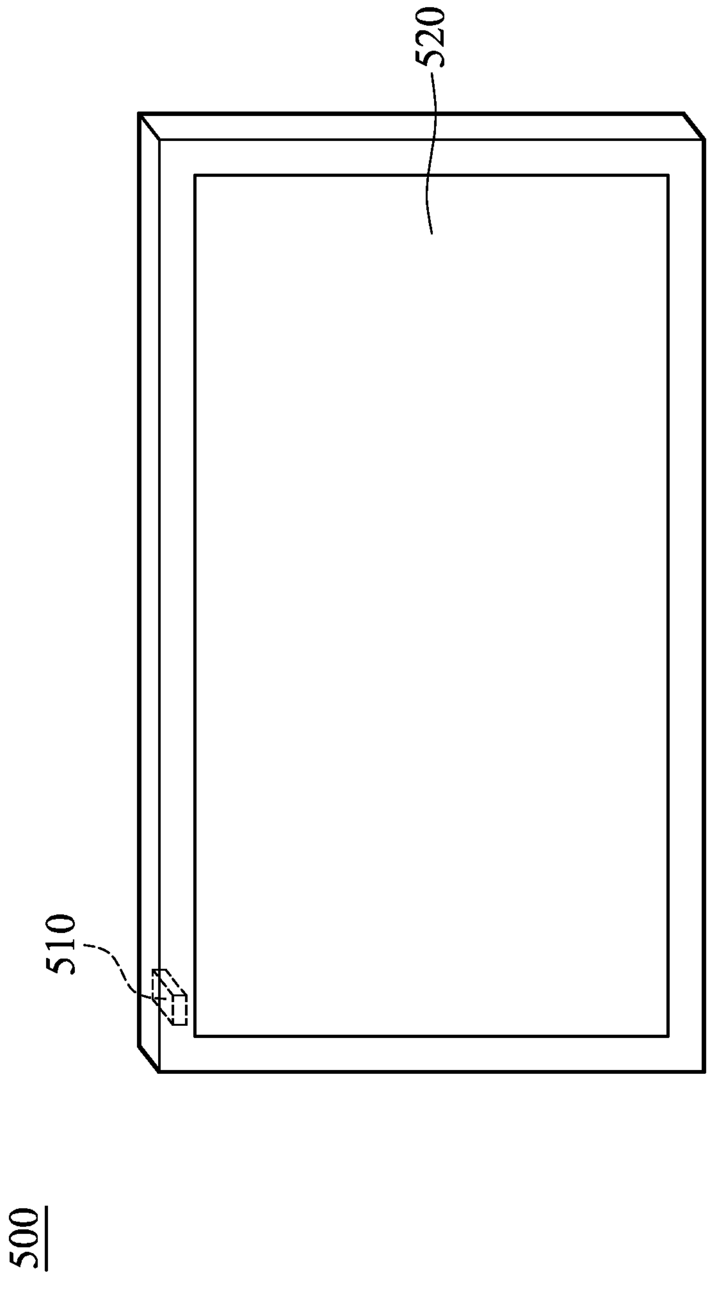
FIG. 5 is a perspective view of a tablet computer according to an embodiment of the invention.

FIG. 5 is a perspective view of a tablet computer 500 according to an embodiment of the invention. In the embodiment of FIG. 5, the aforementioned hybrid antenna structure is disposed at a specific position 510 adjacent to a display device 520 of the tablet computer 500, and it is used together with a nonconductive support element having a 3D L-shape, thereby minimizing the whole size.

The invention proposes a novel mobile device. Compared to the conventional design, the invention has at least the advantages of smaller size, lower SAR, and better communication quality, and therefore it is suitable for application in a variety of mobile communication devices.

Note that the above element sizes, element shapes, and frequency ranges are not limitations of the invention. An antenna designer can fine-tune these settings or values according to different requirements. It should be understood that the mobile device of the invention is not limited to the configurations depicted in FIGS. 1-5. The invention may simply include one or more features of one or more embodiments of FIGS. 1-5. In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device with communication and sensing functions, comprising:
- a first radiation element, having a feeding point;
- a second radiation element, coupled to the first radiation element;
- a third radiation element, coupled to the first radiation element, wherein the third radiation element and the second radiation element substantially extend in opposite directions;
- a fourth radiation element, coupled to a ground voltage, wherein the fourth radiation element is adjacent to the third radiation element;
- a capacitor;
- a first metal element, coupled through the capacitor to the ground voltage;
- a second metal element, coupled to the first metal element;
- a third metal element, coupled to the first metal element, wherein the third metal element and the second metal element substantially extend in opposite directions;
- a nonconductive support element, wherein the first radiation element, the second radiation element, the third radiation element, the fourth radiation element, the first metal element, the second metal element, and the third metal element are disposed on the nonconductive support element; and
- a proximity sensor, coupled to the capacitor and the first metal element;

wherein a hybrid antenna structure is formed by the first radiation element, the second radiation element, the third radiation element, the fourth radiation element, the first metal element, the second metal element, and the third metal element;

wherein the hybrid antenna structure covers a first frequency band, a second frequency band, and a third frequency band, the first frequency band is from 700 MHz to 960 MHz, the second frequency band is from 1710 MHz to 2170 MHz, and the third frequency band is from 2300 MHz to 2700 MHZ;

wherein a total length of the first metal element and the third metal element is substantially equal to 0.25 wavelength of the first frequency band, wherein a total length of the first radiation element and the second radiation element is substantially equal to 0.25 wavelength of the second frequency band, and wherein a total length of the second radiation element and the third radiation element is substantially equal to 0.5 wavelength of the third frequency band.

2. The mobile device as claimed in claim 1, wherein a sensing pad of the proximity sensor is formed by the first metal element, the second metal element, and the third metal element.

3. The mobile device as claimed in claim 1, wherein a combination of the first radiation element, the second radiation element, and the third radiation element substantially has a first T-shape.

4. The mobile device as claimed in claim 1, wherein the fourth radiation element substantially has a straight-line shape.

5. The mobile device as claimed in claim 3, wherein a combination of the first metal element, the second metal element, and the third metal element substantially has a second T-shape.

6. The mobile device as claimed in claim 5, wherein a vertical projection of the first T-shape at least partially overlaps the second T-shape.

7. The mobile device as claimed in claim 1, wherein the nonconductive support element substantially has a plate shape or a 3D (Three-dimensional) L-shape.

8. A mobile device with communication and sensing functions, comprising:

a nonconductive support element, substantially having a 3D (Three-dimensional) L-shape, wherein the nonconductive support element has a first surface, a second surface, a third surface, a fourth surface, and a fifth surface;

a first radiation element, having a feeding point;

a second radiation element, coupled to the first radiation element;

a third radiation element, coupled to the first radiation element;

a fourth radiation element, coupled to a ground voltage, wherein the first radiation element, the second radiation element, the third radiation element, and the fourth radiation element are distributed over the first surface, the second surface, the third surface, and the fourth surface of the nonconductive support element;

a first metal element;

a second metal element, coupled to the first metal element; and a third metal element, coupled to the first metal element, wherein the first metal element, the second metal element, and the third metal element are distributed over the fourth surface and the fifth surface of the nonconductive support element;

wherein a hybrid antenna structure is formed by the first radiation element, the second radiation element, the third radiation element, the fourth radiation element, the first metal element, the second metal element, and the third metal element;

wherein the hybrid antenna structure covers a first frequency band, a second frequency band, and a third frequency band, the first frequency band is from 700 MHz to 960 MHz, the second frequency band is from 1710 MHz to 2170 MHz, and the third frequency band is from 2300 MHz to 2700 MHZ;

wherein a total length of the first metal element and the third metal element is substantially equal to 0.25 wavelength of the first frequency band, wherein a total length of the first radiation element and the second radiation element is substantially equal to 0.25 wavelength of the second frequency band, and wherein a total length of the second radiation element and the third radiation element is substantially equal to 0.5 wavelength of the third frequency band.

* * * * *